Aug. 26, 1969  A. POLLAK  3,463,205

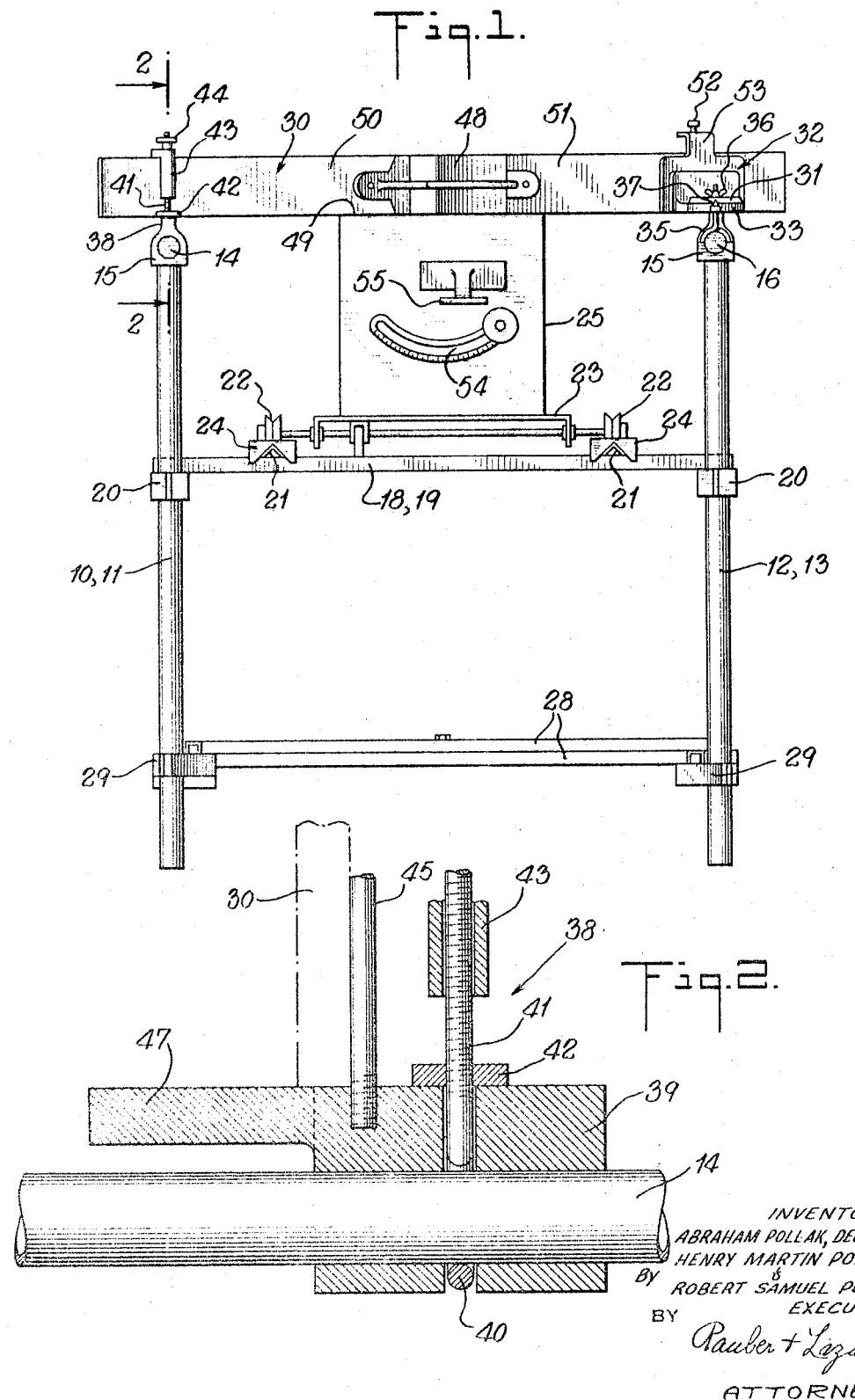

SAW SUPPORTING STRUCTURE

Filed Dec. 5, 1966  3 Sheets-Sheet 3

INVENTOR
ABRAHAM POLLAK, DECEASED
By HENRY MARTIN POLLAK
ROBERT SAMUEL POLLAK
EXECUTORS
BY
Rauber + Lazar
ATTORNEYS

United States Patent Office 3,463,205
Patented Aug. 26, 1969

3,463,205
SAW SUPPORTING STRUCTURE
Abraham Pollak, deceased, late of Pottstown, Pa., by Henry Martin Pollak and Robert Samuel Pollak, executors, Pottstown, Pa. (both % American Machine and Tool Company, Inc., Royersford, Pa. 19468)
Filed Dec. 5, 1966, Ser. No. 599,683
Int. Cl. B27b 5/18, 27/06
U.S. Cl. 143—47
6 Claims

ABSTRACT OF THE DISCLOSURE

A structure which is adapted to receive a handsaw or tablesaw and to convert the regular operation thereof into the action of a radial-arm saw. The structure comprises a rectangular frame which includes a pair of adjustable lower beams adapted to mounting a saw thereon in movable relation and an adjustable workpiece backstop designed to be oriented in any angular relation with a saw and to hold the workpiece solidly as the saw is drawn through it.

---

The present invention relates to a structure for so supporting a power driven saw, such as a handsaw or bench-type saw, and guiding it so that it may be moved into and through a workpiece with accuracy and precision. If the workpiece is to be cross cut on a bench saw as heretofore known it is held against the face of the mitre gauge and pushed through the cutting tool. However, in this operation since the workpiece is supported on only one side of the cutting tool and the pressure of the tool is on the unsupported side it is difficult to make an annular or square cut. If the workpiece is long and overhangs the table it is still more difficult to manage the workpiece and make an accurate cut.

Moreover, the width of the workpiece to be cross cut is, of course, limited by the distance between the face of the mitre gauge and the front of the saw blade. Electric handsaws are fed into the workpiece but they are held manually and a precise cut is difficult to make.

In the structure of the present invention a handsaw or a bench saw is so supported and guided that accurate and precise cuttings may readily be made within a long piece to be cross cut.

The structure of the present invention comprises four vertical posts arranged at the corners of a rectangle, a pair of lower beams positioned in a horizontal plane between the upper and lower ends of the posts connecting the posts at the front and rear ends of the rectangle, respectively. On the upper ends of the posts a pair of parallel beams arranged at the sides of the rectangle connects the posts and forms a support and guide for the workpiece.

A pair of parallel rails is mounted on the lower beams and is generally parallel to the upper beams. These rails support a carriage for a power saw. Preferably the rails slope upwardly to a ridge and the wheels of the carriage are grooved to a surface complementary to the ridge surface of the rails. The structure may also be strengthened and rendered more rigid by diagonal bracing rods below the level of the lower beams. The lower beams are secured to the posts by clamps and may be individually raised and lowered to bring the carriage and the saw supported on it into proper relationship with the upper beams as, for example, by having a workpiece suporting surface of the saw in the same plane as the upper edges of the upper beams.

The upper beams are adapted to support a "backstop" as, for example, an element having a surface opposite the carriage of the saw and supported on the upper beams so that a workpiece to be sawed may be held against this backstop while the saw mounted on the carriage may be drawn into cutting engagement and be cut through the workpiece. The backstop may be mounted on the beams in such manner that it can have different angular positions relative to the upper beams as, for example, at a right angle, or at a skew inclined to the length of the upper beams. To enable the saw to move past the workpiece so as to sever it completely, the backstop is provided with a recess to receive the saw. The angular position of the backstop may be adjusted by having a support or anchoring means on one of the upper beams which permits a turning on swiveling on the beams, and inner means engaging the opposite beam for holding the backstop in any position of adjustment. The backstop also is provided with a pair of extensions or feet extending toward the carriage and the saw on which a workpiece may be supported.

The various features of the invention are illustrated in the accompanying drawings in which:

FIG. 1 is a vertical front elevation of the structure, together with a saw mounted on the carriage;

FIG. 2 is a vertical section of a part of the structure taken on line 2—2 of FIG. 1;

Figure 3:
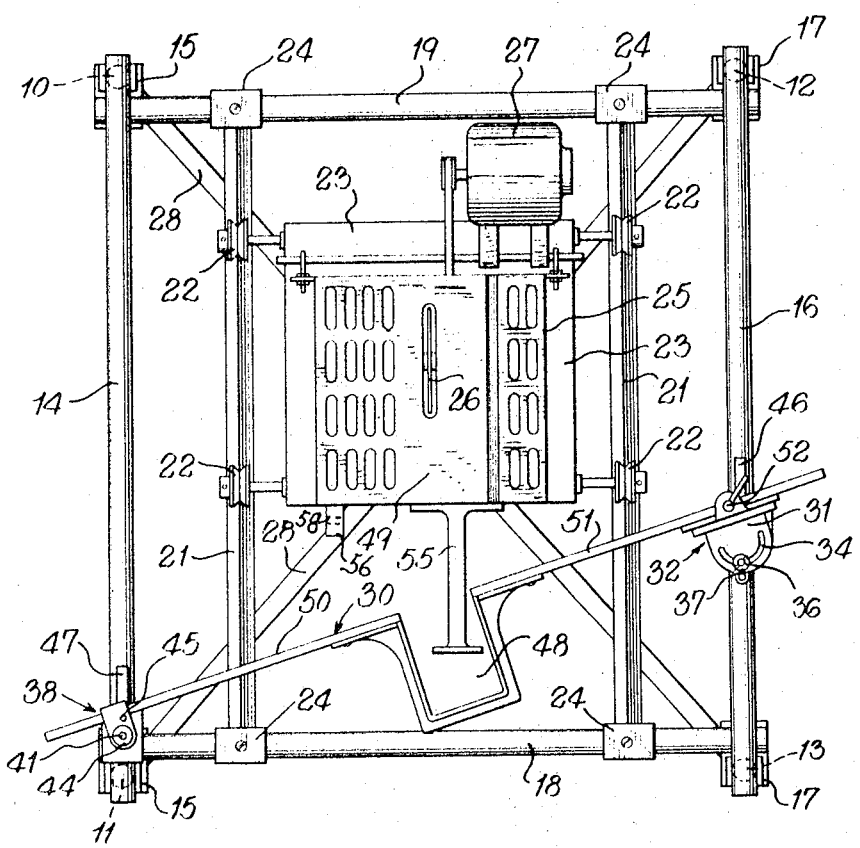
FIG. 3 is a plan view of the structure and saw mounted thereon.

As shown in the drawings, four vertical posts 10, 11, 12 and 13 are positioned at the four corners of a rectangle as shown in FIG. 3. An upper side beam 14 is mounted by means of cap pieces 15 on the upper ends of the posts 10 and 11, and a beam 16 is similarly mounted on the posts 12 and 13 in similar cap pieces 17.

On a level below that of the upper beams 14 and 16 are mounted a front lower beam 18 and a rear lower beam 19, these beams being transverse to the beams 14 and 16. The lower beams are mounted on vertically adjustable brackets 20 on each of the posts 10–13. The lower beams support a pair of parallel spaced rails 21 for a carriage carrying the power saw.

As shown particularly in FIG. 1, the rails 21 have a gabled shape forming a ridge for the wheels 22 of a saw carriage 23 so that the carriage will be accurately movable lengthwise of the rails. The rails are secured on the lower beams by means of blocks 24 which also act as stops for the carriage to guard against the carriage passing beyond the lengths of the rails.

The blocks 24 are secured on the lower beams by means of bolts, which being of ordinary construction are not illustrated. A power saw 25 mounted on the carriage 23 comprises a circular saw 26 in a plane parallel to the rails 21 and a motor 27 for driving the saw.

The above construction may be further strengthened and rendered more rigid by means of a pair of cross braces 28 secured to each other and to the posts 10–13 by brackets 29. Inasmuch as the posts, the upper and lower beams, the rails and the braces 28 are all adjustably secured in their proper arrangement, the above structure may be of a "takedown" type so that it may be disassembled for transportation and reassembled for use.

The various beams and braces may be made of metal, either hollow or structural, or of wood.

Supportable on the upper beams is a backstop 30 in a position transverse to the upper beams and to the plane of the saw. At one end, the end at the right in FIG. 3, this backstop is supported on a segment 31 secured to the backstop by means of a clamp 32. The segment 31 is supported on a base 33 and has an arcuate slot 34 centered on a vertical axis about which the segment may turn relative to the base 33. The base 33 and segment assembly are clamped to the upper beam 16 by means of an eyebolt 35, FIG. 1, the eye of which embraces the beam 16, the shank of which extends upwardly through the base 33 and arcuate slot 34 and on which is threaded a wing nut 36 whereby the segment may be gripped to the beam after its position and angle to the beam have been determined. The segment may be graduated and the base may be provided with a witness finger 37, FIG. 3, whereby the angle of inclination to the beam 16 may be indicated.

The backstop spans the space between the upper beams 14 and 16 and extends beyond these beams. The part of the backstop extending over the upper beam 14 is secured to said beam by a clamping means 38, shown in detailed section on a larger scale in FIG. 2. The clamping means comprises a base plate 39 through which the upper beam 14 extends and an eyebolt 40 having a loop through which the beam 14 extends and a threaded stem 41 extending upwardly through an opening in the base plate 39. A nut 42 is threaded onto the stem 41 and may be tightened on the base plate 39 to draw the eye of the bolt upwardly and thus clamp the base plate onto the beam 14.

A bracket 43 is loosely mounted on the stem 41 and has a part extending over the upper edge of the backstop. A nut 44, FIG. 1, is threaded downwardly on the stem 41 to draw the bracket 43 and with it the backstop 30 downwardly into pressure contact with the upper surface of the base plate 39. The backstop abuts a pin 45, FIGS. 2 and 3, spaced slightly from the stem 41 of the eyebolt to form a support for the backstop 30 against pressure applied by the saw or cutting element.

Figure 4:
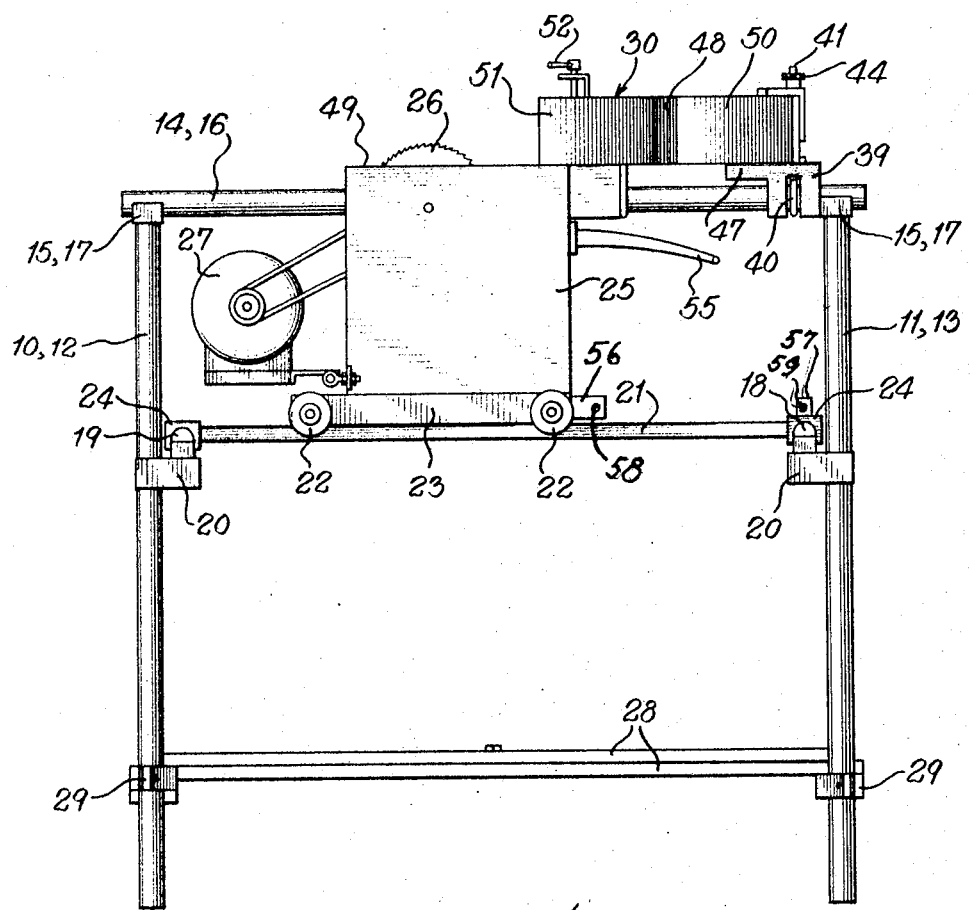
FIG. 4 is a side view of the structure and saw.

The provision of the pin 45 enables the backstop to take a position at an acute angle to the upper beam 14 independently of its engagement against the stem of the eyebolt 40. Feet 46 and 47, as shown in FIGS. 3 and 4, extend from the base 33 and the base plate 39 rearwardly toward the saw to enable a workpiece to be supported vertically against the face of the backstop 30.

The backstop 30, shown by example in the drawings, comprises a recessed element 48, as shown in FIG. 3, into which the edge of a saw may enter as it saws through a workpiece, such as a beam, held against the surface of the backstop. When the workpiece is sufficiently wide it may be supported on the two feet 46 and 47 adjacent the backstop and on the supporting surface 49 of the saw.

The backstop may comprise a plate or pair of aligned plates 50 and 51 joined by the recessed element 48 and resting on the feet 46 and 47 and clamped downwardly on these feet by the nut 44 on the upper beam 14, and by a screw 52 extending through a bracket 53 secured to the segment 31.

As indicated the saw may be one in which the plane of the saw blade or disc may be tilted to an angle as indicated by the slot 54 in FIG. 1, and it is provided with a handle 55, shown in FIG. 3, whereby it may be drawn forwardly into the recess 48.

In operation the workpiece is held against the backstop 30 while resting on the feet 46 and 47, and if circumstances required, on the supporting surface of the saw 49. By then drawing the saw forwardly on the rails 21 an accurate cut may be made inasmuch as the workpiece is held securely and firmly against the backstop. The position of the saw element on the carriage may be adjusted by known means.

The various elements of the structure may be made of metal. Or, where they are merely supporting structures such as the beams, posts, etc., they may be made of wood. They may be unclamped and disassembled for shipping or moving and may be reassembled for use.

A bench saw or a motor driven handsaw may thus be mounted for accurate work on an inexpensive simple structure and have all of the advantages of a saw of the type known as "radial saws" in which the saw is moved into working engagement with a workpiece held in fixed position.

To enable the apparatus to be used as a bench saw with the saw in fixed position against which a workpiece is advanced, means are provided for securing the carriage 25 in fixed position. As an example of such means the carriage is provided with a projection 56 at its lower part, as shown in FIG. 4, which is moved against a projection 57 on the front lower beam 18 and locked into engagement with said projection 57. Such locking means may comprise a pin or bolt, not shown, passing through an opening 58 in the projection 56 and opening 59 in the projection 57. The backstop 30 may be removed and the workpiece advanced against the saw 26 with or without a guide.

What is claimed is:

1. An adjustable saw supporting structure which comprises four posts (10–13), one at each corner of a rectangle, a pair of vertically adjustable lower beams (18, 19) in a horizontal plane between the upper and lower ends of said posts, one beam connecting the posts at one end of said rectangle and the other connecting the posts at the other end of the rectangle, a pair of adjustable upper beams (14, 16) in a horizontal plane above the plane of the lower beams, one of said upper beams (14) connecting the posts (10, 12) on one side of the rectangle and the other upper beam (16) connecting the posts (11, 13) at the other side of said rectangle, a pair of parallel rails (21) mounted on said lower adjustable beams (18, 19) and parallel to said upper beams (14, 16), a movable carriage (23) mounted on said rails and a saw (25, 26) mounted on said carriage, and a backstop (30) movably mounted on said upper beams (14, 16), said backstop including means (32, 38) for adjustment of the position of said backstop to a desired orientation with respect to said beams (14, 16).

2. A structure according to claim 1 wherein said rails (21) have a longitudinally extending ridge to receive the movable means of said carriage.

3. A structure according to claim 1 wherein said backstop (30) is mounted on and extends transversely between said upper beams (14, 16) and has a surface (50) to position a workpiece for sawing including an aperture (48) to receive a saw passing through said workpiece.

4. A structure according to claim 1 wherein said adjustable means to secure said backstop (30) on said upper beams (14, 16) comprises a pair of clamps (32, 38), one for each beam and a pair of bolts, one movable to adjusted positions on one of said beams and extending through one of said clamps to clamp said backstop on said upper beams (14, 16) at any position of inclination to said beams.

5. A structure according to claim 4 in which one of said clamps (32) has a part clamped in fixed position on the upper beam (16) on which it is mounted and having a witness finger (37) and a part fixed to said backstop and having an arcuate slot (34) through which said clamping bolt extends and graduations to indicate the inclination of said backstop to said rails.

6. A structure according to claim 1 which includes means to secure said carriage in fixed position on said structure.

References Cited

UNITED STATES PATENTS

| | | |
|---|---|---|
| 1,792,955 | 2/1931 | Willis. |
| 1,816,069 | 7/1931 | Bennett. |
| 2,601,878 | 7/1952 | Anderson. |
| 2,703,115 | 3/1955 | Beagle. |

DONALD R. SCHRAN, Primary Examiner

U.S. Cl. X.R.

143—6